(12) United States Patent
Gladwin et al.

(10) Patent No.: US 8,468,311 B2
(45) Date of Patent: Jun. 18, 2013

(54) SYSTEM, METHODS, AND APPARATUS FOR SUBDIVIDING DATA FOR STORAGE IN A DISPERSED DATA STORAGE GRID

(75) Inventors: S. Christopher Gladwin, Chicago, IL (US); Matthew M. England, Chicago, IL (US)

(73) Assignee: Cleversafe, Inc., Chicago, IL (US)

( * ) Notice: Subject to any disclaimer, the term of this patent is extended or adjusted under 35 U.S.C. 154(b) by 0 days.

(21) Appl. No.: 13/488,650

(22) Filed: Jun. 5, 2012

(65) Prior Publication Data

US 2012/0246421 A1    Sep. 27, 2012

Related U.S. Application Data

(63) Continuation of application No. 12/575,577, filed on Oct. 8, 2009, now Pat. No. 8,244,991, which is a continuation of application No. 11/241,555, filed on Sep. 30, 2005, now Pat. No. 7,953,937.

(51) Int. Cl.
*G06F 12/00* (2006.01)

(52) U.S. Cl.
USPC .... 711/154; 711/161; 711/170; 711/E12.001; 709/219

(58) Field of Classification Search
USPC .......... 711/154, 161, 170, E12.001; 709/219
See application file for complete search history.

(56) References Cited

U.S. PATENT DOCUMENTS

| | | |
|---|---|---|
| 4,092,732 A | 5/1978 | Ouchi |
| 5,454,101 A | 9/1995 | Mackay et al. |
| 5,485,474 A | 1/1996 | Rabin |
| 5,774,643 A | 6/1998 | Lubbers et al. |
| 5,802,364 A | 9/1998 | Senator et al. |
| 5,809,285 A | 9/1998 | Hilland |
| 5,890,156 A | 3/1999 | Rekieta et al. |
| 5,987,622 A | 11/1999 | Lo Verso et al. |
| 5,991,414 A | 11/1999 | Garay et al. |
| 6,012,159 A | 1/2000 | Fischer et al. |
| 6,058,454 A | 5/2000 | Gerlach et al. |
| 6,128,277 A | 10/2000 | Bruck et al. |
| 6,175,571 B1 | 1/2001 | Haddock et al. |
| 6,192,472 B1 | 2/2001 | Garay et al. |
| 6,256,688 B1 | 7/2001 | Suetaka et al. |
| 6,272,658 B1 | 8/2001 | Steele et al. |
| 6,301,604 B1 | 10/2001 | Nojima |
| 6,356,949 B1 | 3/2002 | Katsandres et al. |
| 6,366,995 B1 | 4/2002 | Vilkov et al. |
| 6,374,336 B1 | 4/2002 | Peters et al. |
| 6,415,373 B1 | 7/2002 | Peters et al. |
| 6,418,539 B1 | 7/2002 | Walker |
| 6,449,688 B1 | 9/2002 | Peters et al. |
| 6,567,948 B2 | 5/2003 | Steele et al. |
| 6,571,282 B1 | 5/2003 | Bowman-Amuah |
| 6,609,223 B1 | 8/2003 | Wolfgang |

(Continued)

OTHER PUBLICATIONS

Shamir; How to Share a Secret; Communications of the ACM; vol. 22, No. 11; Nov. 1979; pp. 612-613.

(Continued)

*Primary Examiner* — Yong Choe
(74) *Attorney, Agent, or Firm* — Garlick & Markison; Timothy W. Markison (57) ABSTRACT

An efficient method for breaking source data into smaller data subsets and storing those subsets along with coded information about some of the other data subsets on different storage nodes such that the original data can be recreated from a portion of those data subsets in an efficient manner.

11 Claims, 8 Drawing Sheets

U.S. PATENT DOCUMENTS

| | | | |
|---|---|---|---|
| 6,718,361 | B1 | 4/2004 | Basani et al. |
| 6,760,808 | B2 | 7/2004 | Peters et al. |
| 6,785,768 | B2 | 8/2004 | Peters et al. |
| 6,785,783 | B2 | 8/2004 | Buckland |
| 6,826,711 | B2 | 11/2004 | Moulton et al. |
| 6,879,596 | B1 | 4/2005 | Dooply |
| 7,003,688 | B1 | 2/2006 | Pittelkow et al. |
| 7,024,451 | B2 | 4/2006 | Jorgenson |
| 7,024,609 | B2 | 4/2006 | Wolfgang et al. |
| 7,080,101 | B1 | 7/2006 | Watson et al. |
| 7,103,824 | B2 | 9/2006 | Halford |
| 7,103,915 | B2 | 9/2006 | Redlich et al. |
| 7,111,115 | B2 | 9/2006 | Peters et al. |
| 7,140,044 | B2 | 11/2006 | Redlich et al. |
| 7,146,644 | B2 | 12/2006 | Redlich et al. |
| 7,171,493 | B2 | 1/2007 | Shu et al. |
| 7,222,133 | B1 | 5/2007 | Raipurkar et al. |
| 7,240,236 | B2 | 7/2007 | Cutts et al. |
| 7,272,613 | B2 | 9/2007 | Sim et al. |
| 2002/0062422 | A1 | 5/2002 | Butterworth et al. |
| 2002/0166079 | A1 | 11/2002 | Ulrich et al. |
| 2003/0018927 | A1 | 1/2003 | Gadir et al. |
| 2003/0037261 | A1 | 2/2003 | Meffert et al. |
| 2003/0065617 | A1 | 4/2003 | Watkins et al. |
| 2003/0084020 | A1 | 5/2003 | Shu |
| 2004/0024963 | A1 | 2/2004 | Talagala et al. |
| 2004/0122917 | A1 | 6/2004 | Menon et al. |
| 2004/0215998 | A1 | 10/2004 | Buxton et al. |
| 2004/0228493 | A1 | 11/2004 | Ma et al. |
| 2005/0100022 | A1 | 5/2005 | Ramprashad |
| 2005/0114594 | A1 | 5/2005 | Corbett et al. |
| 2005/0125593 | A1 | 6/2005 | Karpoff et al. |
| 2005/0131993 | A1 | 6/2005 | Fatula, Jr. |
| 2005/0132070 | A1 | 6/2005 | Redlich et al. |
| 2005/0144382 | A1 | 6/2005 | Schmisseur |
| 2005/0229069 | A1 | 10/2005 | Hassner |
| 2006/0047907 | A1 | 3/2006 | Shiga et al. |
| 2006/0136448 | A1 | 6/2006 | Cialini et al. |
| 2006/0156059 | A1 | 7/2006 | Kitamura |
| 2006/0224603 | A1 | 10/2006 | Correll, Jr. |
| 2007/0079081 | A1 | 4/2007 | Gladwin et al. |
| 2007/0079082 | A1 | 4/2007 | Gladwin et al. |
| 2007/0079083 | A1 | 4/2007 | Gladwin et al. |
| 2007/0088970 | A1 | 4/2007 | Buxton et al. |
| 2007/0174192 | A1 | 7/2007 | Gladwin et al. |
| 2007/0214285 | A1 | 9/2007 | Au et al. |
| 2007/0234110 | A1 | 10/2007 | Soran et al. |
| 2007/0283167 | A1 | 12/2007 | Venters, III et al. |
| 2009/0094251 | A1 | 4/2009 | Gladwin et al. |
| 2009/0094318 | A1 | 4/2009 | Gladwin et al. |
| 2010/0023524 | A1 | 1/2010 | Gladwin et al. |

OTHER PUBLICATIONS

Rabin; Efficient Dispersal of Information for Security, Load Balancing, and Fault Tolerance; Journal of the Association for Computer Machinery; vol. 36, No. 2; Apr. 1989; pp. 335-348.

Chung; An Automatic Data Segmentation Method for 3D Measured Data Points; National Taiwan University; pp. 1-8; 1998.

Plank, T1: Erasure Codes for Storage Applications; FAST2005, 4th Usenix Conference on File Storage Technologies; Dec. 13-16, 2005; pp. 1-74.

Wildi; Java iSCSi Initiator; Master Thesis; Department of Computer and Information Science, University of Konstanz; Feb. 2007; 60 pgs.

Legg; Lightweight Directory Access Protocol (LDAP): Syntaxes and Matching Rules; IETF Network Working Group; RFC 4517; Jun. 2006; pp. 1-50.

Zeilenga; Lightweight Directory Access Protocol (LDAP): Internationalized String Preparation; IETF Network Working Group; RFC 4518; Jun. 2006; pp. 1-14.

Smith; Lightweight Directory Access Protocol (LDAP): Uniform Resource Locator; IETF Network Working Group; RFC 4516; Jun. 2006; pp. 1-15.

Smith; Lightweight Directory Access Protocol (LDAP): String Representation of Search Filters; IETF Network Working Group; RFC 4515; Jun. 2006; pp. 1-12.

Zeilenga; Lightweight Directory Access Protocol (LDAP): Directory Information Models; IETF Network Working Group; RFC 4512; Jun. 2006; pp. 1-49.

Sciberras; Lightweight Directory Access Protocol (LDAP): Schema for User Applications; IETF Network Working Group; RFC 4519; Jun. 2006; pp. 1-33.

Harrison; Lightweight Directory Access Protocol (LDAP): Authentication Methods and Security Mechanisms; IETF Network Working Group; RFC 4513; Jun. 2006; pp. 1-32.

Zeilenga; Lightweight Directory Access Protocol (LDAP): Technical Specification Road Map; IETF Network Working Group; RFC 4510; Jun. 2006; pp. 1-8.

Zeilenga; Lightweight Directory Access Protocol (LDAP): String Representation of Distinguished Names; IETF Network Working Group; RFC 4514; Jun. 2006; pp. 1-15.

Sermersheim; Lightweight Directory Access Protocol (LDAP): The Protocol; IETF Network Working Group; RFC 4511; Jun. 2006; pp. 1-68.

Satran, et al.; Internet Small Computer Systems Interface (iSCSI); IETF Network Working Group; RFC 3720; Apr. 2004; pp. 1-257.

Xin, et al.; Evaluation of Distributed Recovery in Large-Scale Storage Systems; 13th IEEE International Symposium on High Performance Distributed Computing; Jun. 2004; pp. 172-181.

| Outage Type Num | Decode Operation | Decoded Data |
| --- | --- | --- |
| 1 | decode 1 | d[0+offset]=c3d(2, 3, 4, offset) |
| 1 | decode 2 | d[1+offset]=c3d(3, 4, 5, offset) |
| 2 | decode 1 | d[0+offset]=c3d(5, 1, 3, offset) |
| 2 | decode 2 | d[2+offset]=c3d(1, 3, 5, offset) |
| 3 | decode 1 | d[0+offset]=c3d(4, 2, 5, offset) |
| 3 | decode 2 | d[3+offset]=c3d(1, 2, 5, offset) |

FIG. 6

| Outage Type Num | Decode Operation | Decoded Data |
|---|---|---|
| 1 | decode 1 | d[1+offset]=c3d(3, 4, 5, offset) |
| 1 | decode 2 | d[0+offset]=c3d(5, 1, 3, offset) |
| 1 | decode 3 | d[2+offset]=c3d(4, 5, 0, offset) |
| 2 | decode 1 | d[0+offset]=c3d(4, 5, 2, offset) |
| 2 | decode 2 | d[3+offset]=c3d(2, 4, 0, offset) |
| 2 | decode 3 | d[1+offset]=c3d(5, 0, 3, offset) |
| 3 | decode 1 | d[1+offset]=(d(c[3+offset]-d[5+offset]+c[5+offset]-c[2+offset])/2 |
| 3 | decode 2 | d[4+offset]=c3d(3, 5, 1, offset) |
| 3 | decode 3 | d[0+offset]=c3d(5, 1, 3, offset) |
| 4 | decode 1 | d[2+offset]=c3d(1, 3, 5, offset) |
| 4 | decode 2 | d[0+offset]=c3d(5, 1, 3, offset) |
| 4 | decode 3 | d[4+offset]=c3d(3, 5, 1, offset) |

FIG.7

| Node0 | Node1 | Node2 | Node3 | Node4 | Node5 | Node6 | Node7 | Node8 | Type | Offset |
|---|---|---|---|---|---|---|---|---|---|---|
| x | x |   |   |   |   |   |   |   | 2 | 0 |
| x |   | x |   |   |   |   |   |   | 2 | 0 |
| x |   |   | x |   |   |   |   |   | 2 | 0 |
| x |   |   |   | x |   |   |   |   | 2 | 0 |
| x |   |   |   |   | x |   |   |   | 2 | 5 |
| x |   |   |   |   |   | x |   |   | 2 | 6 |
| x |   |   |   |   |   |   | x |   | 2 | 7 |
| x |   |   |   |   |   |   |   | x | 2 | 8 |
|   | x | x |   |   |   |   |   |   | 2 | 1 |
|   | x |   | x |   |   |   |   |   | 2 | 1 |
|   | x |   |   | x |   |   |   |   | 2 | 1 |
|   | x |   |   |   | x |   |   |   | 2 | 1 |
|   | x |   |   |   |   | x |   |   | 2 | 6 |
|   | x |   |   |   |   |   | x |   | 2 | 7 |
|   | x |   |   |   |   |   |   | x | 2 | 8 |
|   |   | x | x |   |   |   |   |   | 2 | 2 |
|   |   | x |   | x |   |   |   |   | 2 | 2 |
|   |   | x |   |   | x |   |   |   | 2 | 2 |
|   |   | x |   |   |   | x |   |   | 2 | 2 |
|   |   | x |   |   |   |   | x |   | 2 | 7 |
|   |   | x |   |   |   |   |   | x | 2 | 8 |
|   |   |   | x | x |   |   |   |   | 2 | 3 |
|   |   |   | x |   | x |   |   |   | 2 | 3 |
|   |   |   | x |   |   | x |   |   | 2 | 3 |
|   |   |   | x |   |   |   | x |   | 2 | 3 |
|   |   |   | x |   |   |   |   | x | 2 | 8 |
|   |   |   |   | x | x |   |   |   | 2 | 4 |
|   |   |   |   | x |   | x |   |   | 2 | 4 |
|   |   |   |   | x |   |   | x |   | 2 | 4 |
|   |   |   |   | x |   |   |   | x | 2 | 4 |
|   |   |   |   |   | x | x |   |   | 2 | 5 |
|   |   |   |   |   | x |   | x |   | 2 | 5 |
|   |   |   |   |   | x |   |   | x | 2 | 5 |
|   |   |   |   |   |   | x | x |   | 2 | 6 |
|   |   |   |   |   |   | x |   | x | 2 | 6 |
|   |   |   |   |   |   |   | x | x | 2 | 7 |

FIG. 8

SYSTEM, METHODS, AND APPARATUS FOR SUBDIVIDING DATA FOR STORAGE IN A DISPERSED DATA STORAGE GRID

CROSS REFERENCES TO PRIORITY APPLICATIONS

This patent application is claiming priority under 35 USC §120 as a continuation patent application of co-pending patent application entitled Systems, Methods, and Apparatus for Subdividing Data for Storage in a Disperse Data Storage Grid, having a filing date of Oct. 8, 2009, and a Ser. No. of 12/575,577, which is claiming priority under 35 USC §120 as a continuation patent application of an issued patent entitled Systems, Methods, and Apparatus for Subdividing Data for Storage in a Disperse Data Storage Grid, having a filing date of Sep. 30, 2005 and a Ser. No. of 11/241,555.

BACKGROUND OF THE INVENTION

1. Field of the Invention

The present invention relates to a distributed data storage system and method for storing data, and more particularly, to a system and method for storing subsets of an original set of data on multiple data storage devices in one or more locations such that the individual data subsets on each digital data storage device are unrecognizable and unusable except when combined with data subsets from other digital data storage devices and in which the data subsets are selected by way of information dispersal algorithms so that even if there is a failure of one or more digital data storage devices, the original data can be reconstructed.

2. Description of the Prior Art

Various data storage systems are known for storing data. Normally such data storage systems store all of the data associated with a particular data set, for example, all the data of a particular user or all the data associated with a particular software application or all the data in a particular file, in a single data space (i.e single digital data storage device). Critical data is known to be initially stored on redundant digital data storage devices. Thus, if there is a failure of one digital data storage device, a complete copy of the data is available on the other digital data storage device. Examples of such systems with redundant digital data storage devices are disclosed in U.S. Pat. Nos. 5,890,156; 6,058,454; and 6,418,539, hereby incorporated by reference. Although such redundant digital data storage systems are relatively reliable, there are other problems with such systems. First, such systems essentially double the cost of digital data storage. Second, all of the data in such redundant digital data storage systems is in one place making the data vulnerable to unauthorized access.

In order to improve the security and thus the reliability of the data storage system, the data may be stored across more than one storage device, such as a hard drive, or removable media, such as a magnetic tape or a so called "memory stick" as set forth in U.S. Pat. No. 6,128,277, hereby incorporated by reference, as well as for reasons relating to performance improvements or capacity limitations. For example, recent data in a database might be stored on a hard drive while older data that is less often used might be stored on a magnetic tape. Another example is storing data from a single file that would be too large to fit on a single hard drive on two hard drives. In each of these cases, the data subset stored on each data storage device does not contain all of the original data, but does contain a generally continuous portion of the data that can be used to provide some usable information. For example, if the original data to be stored was the string of characters in the following sentence:

The quick brown fox jumped over the lazy dog.
and that data was stored on two different data storage devices, then either one or both of those devices would contain usable information. If, for example, the first 20 characters of that 45 character string was stored on one data storage device the remaining 25 characters were stored on a second data storage device, then the sentence be stored as follows:

The quick brown fox jumped (Stored on the first storage device) over the lazy dog. (Stored on the second storage device)

In each case, the data stored on each device is not a complete copy of the original data, but each of the data subsets stored on each device provides some usable information.

Typically, the actual bit pattern of data storage on a device, such as a hard drive, is structured with additional values to represent file types, file systems and storage structures, such as hard drive sectors or memory segments. The techniques used to structure data in particular file types using particular file systems and particular storage structures are well known and allow individuals familiar with these techniques to identify the source data from the bit pattern on a physical media.

In order to make sure that stored data is only available only to authorized users, data is often stored in an encrypted form using one of several known encryption techniques, such as DES, AES or several others. These encryption techniques store data is some coded form that requires a mathematical key that is ideally known only to authorized users or authorized processes. Although these encryption techniques are difficult to "break", instances of encryption techniques being broken are known making the data on such data storage systems vulnerable to unauthorized access.

In addition to securing data using encryption, several methods for improving the security of data storage using information dispersal algorithms have been developed, for example as disclosed in U.S. Pat. No. 6,826,711 and US Patent Application Publication No. US 2005/0144382, hereby incorporated by reference. Such information dispersal algorithms are used to "slice" the original data into multiple data subsets and distribute these subsets to different storage nodes (i.e different digital data storage devices). Individually, each data subset or slice does not contain enough information to recreate the original data; however, when threshold number of subsets (i.e. less than the original number of subsets) are available, all the original data can be exactly created.

The use of such information dispersal algorithms in data storage systems is also described in various trade publications. For example, "How to Share a Secret", by A. Shamir, *Communications of the ACM*, Vol. 22, No. 11, November, 1979, describes a scheme for sharing a secret, such as a cryptographic key, based on polynomial interpolation. Another trade publication, "Efficient Dispersal of Information for Security, Load Balancing, and Fault Tolerance", by M. Rabin, *Journal of the Association for Computing Machinery*, Vol. 36, No. 2, April 1989, pgs. 335-348, also describes a method for information dispersal using an information dispersal algorithm. Unfortunately, these methods and other known information dispersal methods are computationally intensive and are thus not applicable for general storage of large amounts of data using the kinds of computers in broad use by businesses, consumers and other organizations today. Thus there is a need for a data storage system that is able to reliably and securely protect data that does not require the use of computation intensive algorithms.

SUMMARY OF THE INVENTION

Briefly, the present invention relates to a digital data storage system in which original data to be stored is separated into a number of data "slices" or subsets in such a manner that the data in each subset is less usable or less recognizable or completely unusable or completely unrecognizable by itself except when combined with some or all of the other data subsets. These data subsets are stored on separate digital data storage devices as a way of increasing privacy and security. After the system "slices" the original data into data subsets, a coding algorithm is used on the data subsets to create coded data subsets. Each data subset and its corresponding coded subset may be transmitted separately across a communications network and for stored in separate storage nodes in an array of storage nodes. In order to recreate the original data, the data subsets and coded subsets are retrieved from some or all of the storage nodes or communication channels, depending on the availability and performance of each storage node and each communication channel. The original data is then recreated by applying a series of decoding algorithms to the retrieved data and coded data. In accordance with an important aspect of the invention, the system codes and decodes data subsets in a manner that is computationally efficient relative to known systems in order to enable broad use of this method using the types of computers generally used by businesses, consumers and other organizations currently.

DESCRIPTION OF THE DRAWING

These and other advantages of the present invention will be readily understood with reference to the following drawing and attached specification wherein.

DETAILED DESCRIPTION

The present invention relates to a data storage system. In order to protect the security of the original data, the original data is separated into a number of data "slices" or subsets. The amount of data in each slice is less usable or less recognizable or completely unusable or completely unrecognizable by itself except when combined with some or all of the other data subsets. In particular, the system in accordance with the present invention "slices" the original data into data subsets and uses a coding algorithm on the data subsets to create coded data subsets. Each data subset and its corresponding coded subset may be transmitted separately across a communications network and stored in a separate storage node in an array of storage nodes. In order to recreate the original data, data subsets and coded subsets are retrieved from some or all of the storage nodes or communication channels, depending on the availability and performance of each storage node and each communication channel. The original data is recreated by applying a series of decoding algorithms to the retrieved data and coded data.

As with other known data storage systems based upon information dispersal methods, unauthorized access to one or more data subsets only provides reduced or unusable information about the source data. In accordance with an important aspect of the invention, the system codes and decodes data subsets in a manner that is computationally efficient relative to known systems in order to enable broad use of this method using the types of computers generally used by businesses, consumers and other organizations currently.

In order to understand the invention, consider a string of N characters $d_0, d_1, \ldots, d_N$ which could comprise a file or a system of files. A typical computer file system may contain gigabytes of data which would mean N would contain trillions of characters. The following example considers a much smaller string where the data string length, N, equals the number of storage nodes, n. To store larger data strings, these methods can be applied repeatedly. These methods can also be applied repeatedly to store large computer files or entire file systems.

For this example, assume that the string contains the characters, O L I V E R where the string contains ASCII character codes as follows:

$d_0 = O = 79$
$d_1 = L = 76$
$d_2 = I = 73$
$d_3 = V = 86$
$d_4 = E = 69$
$d_5 = R = 82$

The string is broken into segments that are n characters each, where n is chosen to provide the desired reliability and security characteristics while maintaining the desired level of computational efficiency—typically n would be selected to be below 100. In one embodiment, n may be chosen to be greater than four (4) so that each subset of the data contains less than, for example, ¼ of the original data, thus decreasing the recognizablity of each data subset.

In an alternate embodiment, n is selected to be six (6), so that the first original data set is separated into six (6) different data subsets as follows:

$A = d_0, B = d_1, C = d_2, D = d_3, E = d_4, F = d_5$

For example, where the original data is the starting string of ASCII values for the characters of the text O L I V E R, the values in the data subsets would be those listed below:

A=79
B=76
C=73
D=86
E=69
F=82

In this embodiment, the coded data values are created by adding data values from a subset of the other data values in the original data set. For example, the coded values can be created by adding the following data values:

$$c[x]=d[n\_mod(x+1)]+d[n\_mod(x+2)]+d[n\_mod(x+4)]$$

where:
- c[x] is the xth coded data value in the segment array of coded data values
- d[x+1] is the value in the position 1 greater than x in a array of data values
- d[x+2] is the value in the position 2 greater than x in a array of data values
- d[x+4] is the value in the position 4 greater than x in a array of data values
- n_mod( ) is function that performs a modulo operation over the number space 0 to n−1

Using this equation, the following coded values are created:

cA, cB, cC, cD, cE, cF where cA, for example, is equal to B+C+E and represents the coded value that will be communicated and/or stored along with the data value, A.

For example, where the original data is the starting string of ASCII values for the characters of the text O L I V E R, the values in the coded data subsets would be those listed below:
- cA=218
- cB=214
- cC=234
- cD=227
- cE=234
- cF=241

Figure 1:
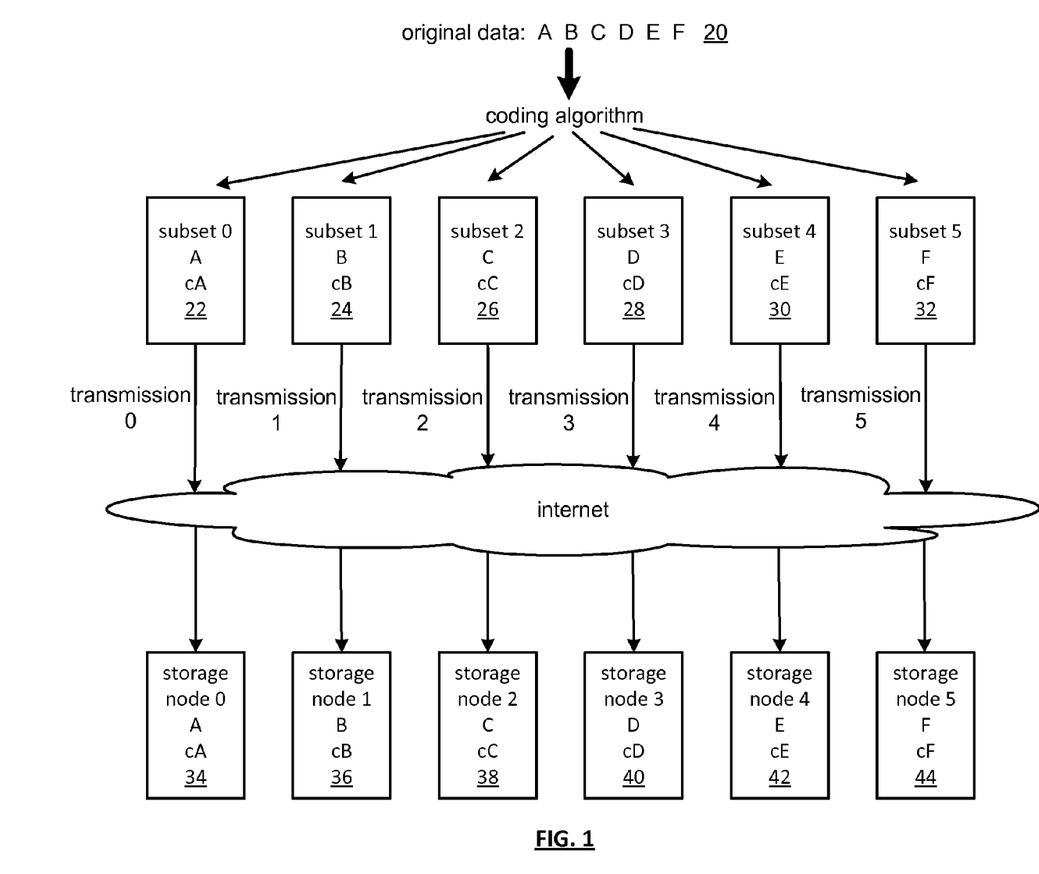
FIG. 1 is a block diagram of an exemplary data storage system with six storage nodes in accordance with the present invention which illustrates how the original data is sliced into data subsets, coded and transmitted to a separate digital data storage device or node.

In accordance with the present invention, the original data set 20, consisting of the exemplary data ABCDEF is sliced into, for example, six (6) data subsets A, B, C, D, E and F. The data subsets A, B, C, D, E and F are also coded as discussed below forming coded data subsets cA, cB, cC, cD, cE and cF. The data subsets A, B, C, D, E and F and the coded data subsets cA, cB, cC, cD, cE and cF are formed into a plurality of slices 22, 24, 26, 28, 30 and 32 as shown, for example, in FIG. 1. Each slice 22, 24, 26, 28, 30 and 32, contains a different data value A, B, C, D, E and F and a different coded subset cA, cB, cC, cD, cE and cF. The slices 22, 24, 26, 28, 30 and 32 may be transmitted across a communications network, such as the Internet, in a series of data transmissions to a series and each stored in a different digital data storage device or storage node 34, 36, 38, 40, 42 and 44.

Figure 2:
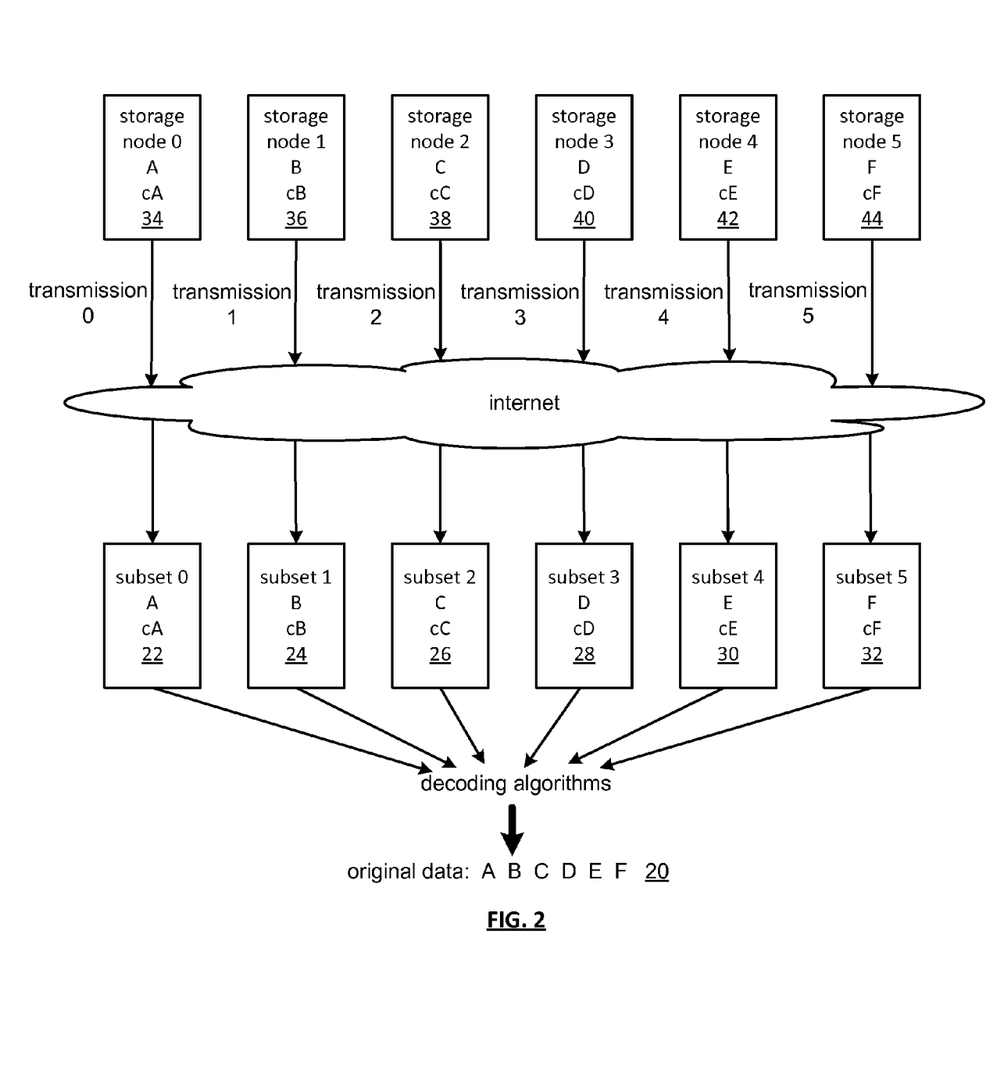
FIG. 2 is similar to FIG. 1 but illustrates how the data subsets from all of the exemplary six nodes are retrieved and decoded to recreate the original data set.

In order to retrieve the original data (or receive it in the case where the data is just transmitted, not stored), the data can reconstructed as-shown in FIG. 2. Data values from each storage node 34, 36, 38, 40, 42 and 44 are transmitted across a communications network, such as the Internet, to a receiving computer (not shown). As shown in FIG. 2, the receiving computer receives the slices 22, 24, 26, 28, 30 and 32, each of which contains a different data value A, B, C, D, E and F and a different coded value cA, cB, cC, cD, cE and cF.

Figure 3:
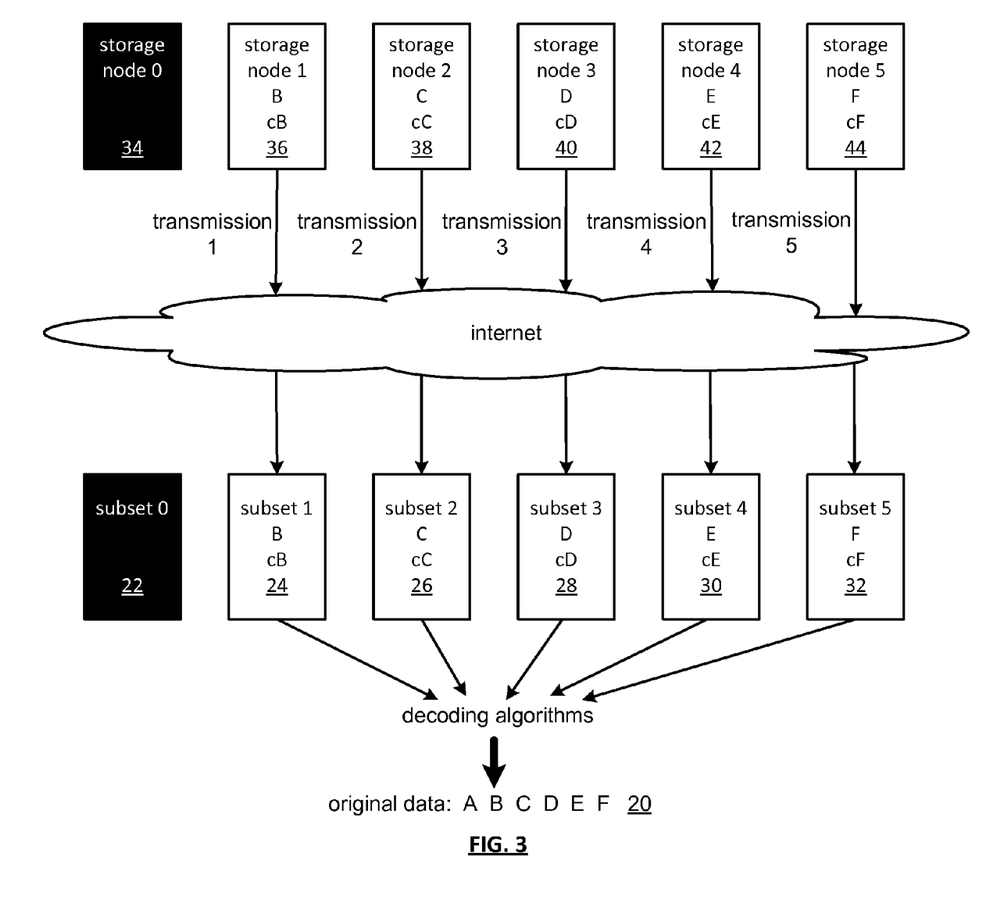
FIG. 3 is similar to FIG. 2 but illustrates a condition of a failure of one of the six digital data storage devices.

For a variety of reasons, such as the outage or slow performance of a storage node 34, 36, 38, 40, 42 and 44 or a communications connection, not all data slices 22, 24, 26, 28, 30 and 32 will always be available each time data is recreated. FIG. 3 illustrates a condition in which the present invention recreates the original data set when one data slice 22, 24, 26, 28, 30 and 32, for example, the data slice 22 containing the data value A and the coded value cA are not available. In this case, the original data value A can be obtained as follows:

$$A=cC-D-E$$

where cC is a coded value and D and E are original data values, available from the slices 26, 28 and 30, which are assumed to be available from the nodes 38, 40 and 42, respectively. In this case the missing data value can be determined by reversing the coding equation that summed a portion of the data values to create a coded value by subtracting the known data values from a known coded value.

For example, where the original data is the starting string of ASCII values for the characters of the text O L I V E R, the data value of the A could be determined as follows:

$$A=234-86-69$$

Therefore A=79 which is the ASCII value for the character, O.

Figure 4:
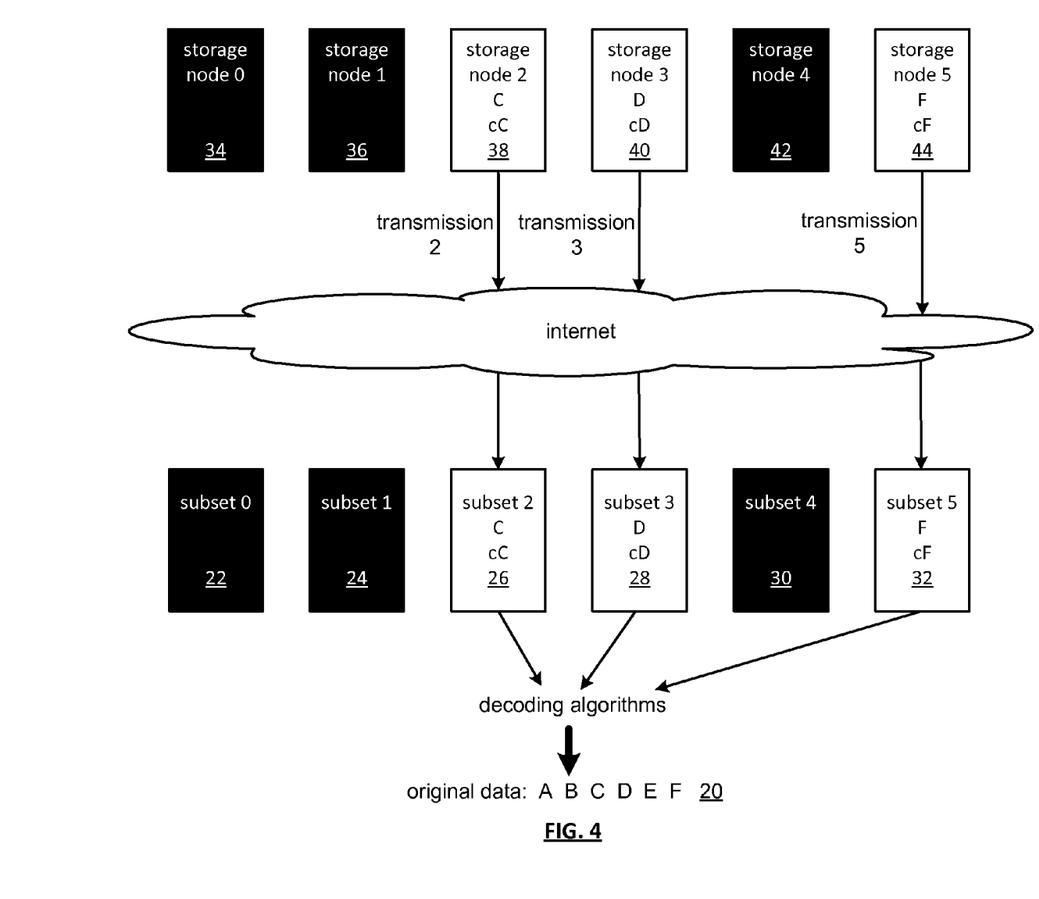
FIG. 4 is similar FIG. 3 but for the condition of a failure of three of the six digital data storage devices.

In other cases, determining the original data values requires a more detailed decoding equation. For example, FIG. 4 illustrates a condition in which three (3) of the six (6) nodes 34, 36 and 42 which contain the original data values A, B and E and their corresponding coded values cA, cB and cE are not available. These missing data values A, B and E and corresponding in FIG. 4 can be restored by using the following sequence of equations:

$$B=(cD-F+cF-cC)/2 \qquad 1.$$

$$E=cD-F-B \qquad 2.$$

$$A=cF-B-D \qquad 3.$$

These equations are performed in the order listed in order for the data values required for each equation to be available when the specific equation is performed.

For example, where the original data is the starting string of ASCII values for the characters of the text O L I V E R, the data values of the B, E and A could be determined as follows:

$$B=(227-82+241-234)/2 \qquad 1.$$

$$B=76$$

$$E=227-82-76 \qquad 2.$$

$$E=69$$

$$A=241-76-86 \qquad 3.$$

$$A=79$$

Figure 5:
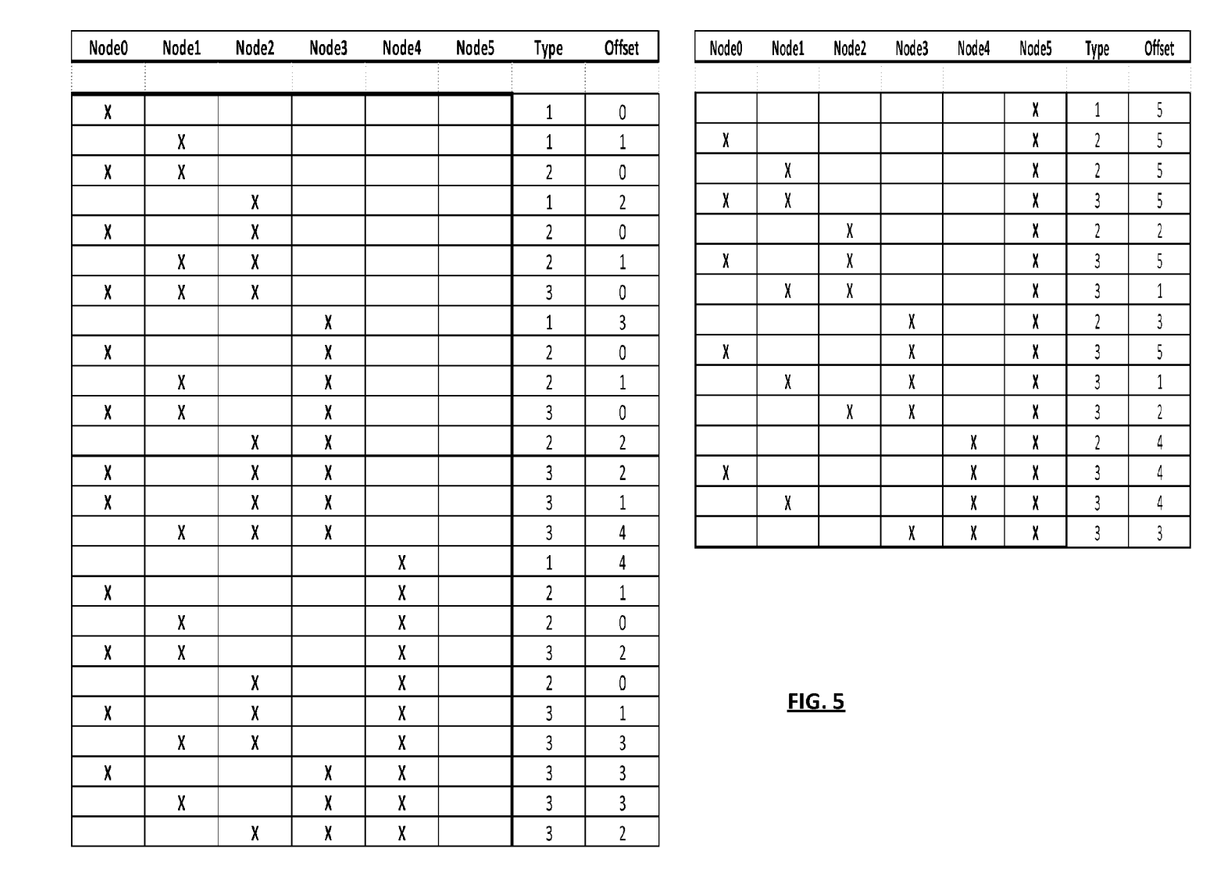
FIG. 5 is an examplary table in accordance with the present invention that can be used to recreate data which has been stored on the exemplary six digital data storage devices.

In order to generalize the method for the recreation of all original data ABCDEF when n=6 and up to three slices 22, 24, 26, 28 30 and 32 are not available at the time of the recreation, FIG. 5 contains a table that can be used to determine how to recreate the missing data.

This table lists the 40 different outage scenarios where 1, 2, or 3 out of six storage nodes are be not available or performing slow enough as to be considered not available. In the table in FIG. 5, an 'X' in a row designates that data and coded values from that node are not available. The 'Type' column designates the number of nodes not available. An 'Offset' value for each outage scenario is also indicated. The offset is the difference the spatial position of a particular outage scenario and the first outage scenario of that Type.

The data values can be represented by the array d[x], where x is the node number where that data value is stored. The coded values can be represented by the array c[x].

In order to reconstruct missing data in an outage scenario where one node is not available in a storage array where n=6, the follow equation can be used:

$$d[0+\text{offset}]=c3d(2, 3, 4, \text{offset})$$

where c3d( ) is a function in pseudo computer software code as follows:

```
c3d(coded_data_pos, known_data_a_pos, known_data_b_pos,
offset)
{
    unknown_data=
        c[n_mod(coded_data_pos+offset)]-
        d[n_mod(known_data_a_pos+offset)]-
        d[n_mod(known_data_b_pos+offset)];
    return unknown_data
}
```
where n_mod( ) is the function defined previously.

Figure 6:
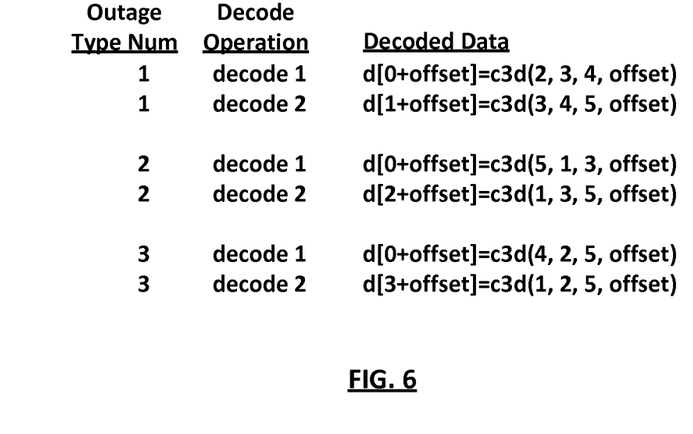
FIG. 6 is an exemplary table that lists the decode equations for an exemplary six node storage data storage system for a condition of two node outages

In order to reconstruct missing data in an outage scenario where two nodes are not available in a storage array where n=6, the equations in the table in FIG. 6 can be used. In FIG. 6, the 'Outage Type Num' refers to the corresponding outage 'Type' from FIG. 5. The 'Decode Operation' in FIG. 6 refers to the order in which the decode operations are performed. The 'Decoded Data' column in FIG. 6 provides the specific decode operations which produces each missing data value.

Figure 7:
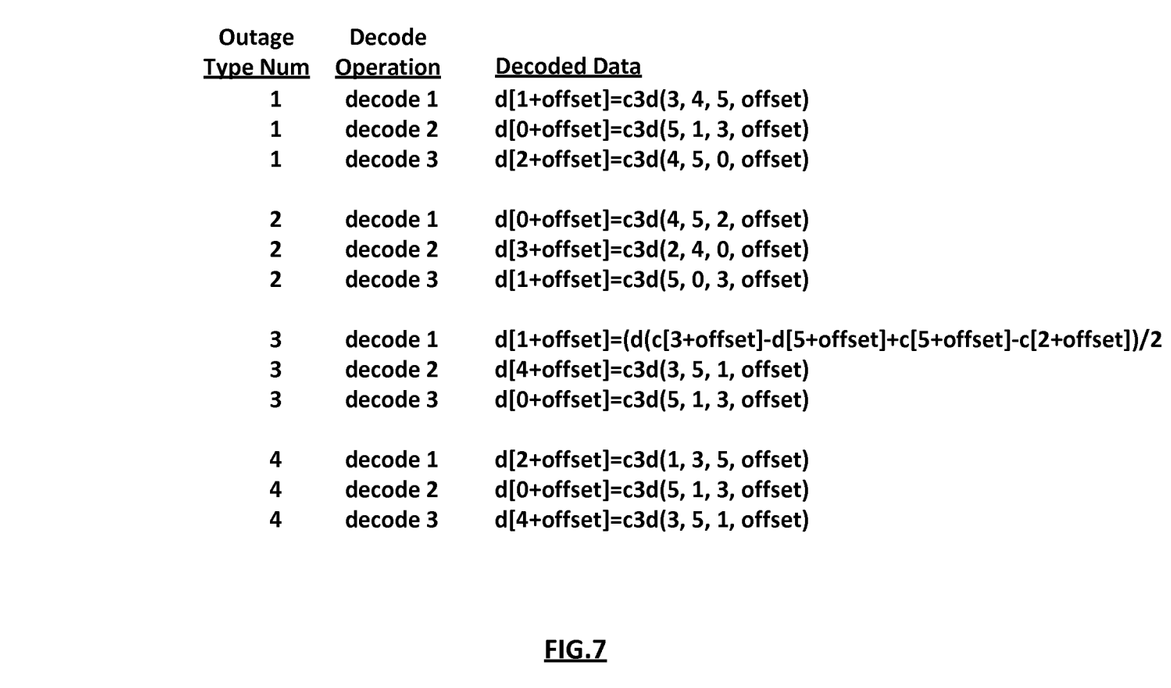
FIG. 7 is similar to FIG. 6 but for a condition with three node outages

In order to reconstruct missing data in an outage scenario where three nodes are not available in a storage array where n=6, the equations in the table in FIG. 7 can be used. Note that in FIG. 7, the structure of the decode equation for the first decode for outage type=3 is a different structure than the other decode equations where n=6.

The example equations listed above are typical of the type of coding and decoding equations that create efficient computing processes using this method, but they only represent one of many examples of how this method can be used to create efficient information distribution systems. In the example above of distributing original data on a storage array of 6 nodes where at least 3 are required to recreate all the data, the computational overhead of creating the coded data is only two addition operations per byte. When data is decoded, no additional operations are required if all storage nodes and communications channels are available. If one or two of the storage nodes or communications channels are not available when n=6, then only two additional addition/subtraction operations are required to decode each missing data value. If three storage nodes or communications channels are missing when n=6, then just addition/subtraction operations are required for each missing byte in 11 of 12 instances—in that twelfth instance, only 4 computational operations are required (3 addition/subtractions and one division by an integer). This method is more computationally efficient that known methods, such as those described by Rabin and Shamir.

This method of selecting a computationally efficient method for secure, distributed data storage by creating coded values to store at storage nodes that also store data subsets can be used to create data storage arrays generally for configurations where n=4 or greater. In each case decoding equations such as those detailed above can be used to recreate missing data in a computationally efficient manner.

Coding and decoding algorithms for varying grid sizes which tolerate varying numbers of storage node outages without original data loss can also be created using these methods. For example, to create a 9 node grid that can tolerate the loss of 2 nodes, a candidate coding algorithm is selected that uses a mathematical function that incorporates at least two other nodes, such as:

$$c[x]=d[n\_mod(x+1)]+d[n\_mod(x+2)]$$

where:
n=9, the number of storage nodes in the grid
c[x] is the xth coded data value in the segment array of coded data values
d[x+1] is the value in the position 1 greater than x in a array of data values
d[x+2] is the value in the position 2 greater than x in a array of data values
n_mod( ) is function that performs a mod over the number space 0 to n−1

In this example embodiment, n=9, the first data segment is separated into different data subsets as follows:

$$A=d_0, B=d_1, C=d_2, D=d_3, E=d_4, F=d_5, G=d_6, H=d_7, I=d_8$$

Using this candidate coding algorithm equation above, the following coded values are created:

$$cA, cB, cC, cD, cE, cF, cG, cH, cI$$

Figure 8:
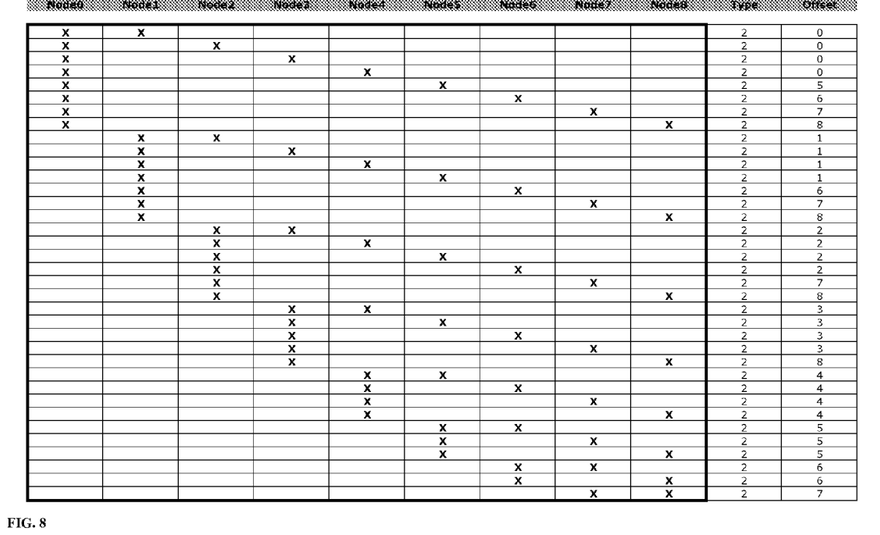
FIG. 8 is a table that lists all possible storage node outage states for an exemplary data storage system with nine storage nodes for a condition with two node outages.

The candidate coding algorithm is then tested against all possible grid outage states of up to the desired number of storage node outages that can be tolerated with complete data restoration of all original data. FIG. 8 lists all possible storage grid cases for a 9 storage node grid with 2 storage node outages. Although there are 36 outage cases on a 9 node storage grid with 2 storage node outages, these can be grouped into 4 Types as shown in FIG. 8. Each of these 4 Types represent a particular spatial arrangement of the 2 outages, such as the 2 storage node outages being spatially next to each other in the grid (Type 1) or the 2 storage node outages being separated by one operating storage node (Type 2). The offset listed in FIG. 8 shows the spatial relationship of each outage case within the same Type as they relate to the first outage case of that Type listed in that table. For example, the first instance of a Type 1 outage in FIG. 8 is the outage case where Node0 and Node1 are out. This first instance of a Type 1 outage is then assigned the Offset value of 0. The second instance of a Type 1 outage in FIG. 8 is the outage case where Node1 and Node2 are out. Therefore, this second instance of a Type 1 outage is assigned the Offset value of 1 since the two storage nodes outages occur at storage nodes that are 1 greater than the location of the storage node outages in the first case of Type 1 in FIG. 8.

The validity of the candidate coding algorithm can them be tested by determining if there is a decoding equation or set of decoding equations that can be used to recreate all the original data in each outage Type and thus each outage case. For example, in the first outage case in FIG. 8, Node0 and Node1 are out. This means that the data values A and B are not directly available on the storage grid. However, A can be recreated from cH as follows:

$$cH=I+A$$

$$A=cH-I$$

The missing data value B can then be created from cI as follows:

$$cI=A+B$$

$$B=cI-A$$

This type of validity testing can then be used to test if all original data can be obtained in all other instances where 2 storage nodes on a 9 node storage grid are not operating. Next, all instances where 1 storage node is not operating on a 9 node storage grid are tested to verify whether that candidate coding algorithm is valid. If the validity testing shows that all original data can be obtained in every instance of 2 storage nodes not operating on a 9 node storage grid and every instance of 1 storage node not operating on a 9 node storage grid, then that coding algorithm would be valid to store data on a 9 node storage grid and then to retrieve all original data from that grid if up to 2 storage nodes were not operating.

These types of coding and decoding algorithms can be used by those practiced in the art of software development to create storage grids with varying numbers of storage nodes with varying numbers of storage node outages that can be tolerated by the storage grid while perfectly restoring all original data.

Obviously, many modifications and variations of the present invention are possible in light of the above teachings. Thus, it is to be understood that, within the scope of the appended claims, the invention may be practiced otherwise than is specifically described above.

What is claimed and desired to be secured by a Letters Patent of the United States is:

1. A method comprises:
   dividing a string of data into a plurality of data subsets;
   generating a plurality of data slice subsets from the plurality of data subsets;
   combining two or more of the plurality of data slice subsets into a first data slice by at least one of:
      appending a first one of the two or more of the plurality of data slice subsets to a second one of the two or more of the plurality of data slice subsets; and
      forming the first data slice from the two or more of the plurality of data slice subsets; and
   combining another two or more of the plurality of data slice subsets into a second data slice.

2. The method of claim 1 further comprises:
   sending the first data slice to a first storage node of a dispersed storage system; and
   sending the second data slice to a second storage node of the dispersed storage system.

3. The method of claim 1, wherein the generating the plurality of data slice subsets from the plurality of data subsets comprises:
   performing a coding function on the plurality of data subsets to produce coded data subsets, wherein the plurality of data slice subsets includes the coded data subsets and the plurality of data subsets.

4. The method of claim 1, wherein the generating the plurality of data slice subsets from the plurality of data subsets comprises:
   performing an information dispersal algorithm on the plurality of data subsets to produce the plurality of data slice subsets.

5. The method of claim 1 further comprises:
   the string of data is one of a plurality of strings of a data, wherein the plurality of strings of data represent a file.

6. The method of claim 5 further comprises:
   dividing a second string of data of the plurality of strings of data into a second plurality of data subsets;
   generating a second plurality of data slice subsets from the second plurality of data subsets;
   combining two or more of the second plurality of data slice subsets into a third data slice;
   combining another two or more of the second plurality of data slice subsets into a fourth data slice;
   sending the third data slice to the first storage node of a dispersed storage system; and
   sending the fourth data slice to the second storage node of the dispersed storage system.

7. A computer comprises:
   a communication network interface;
   a computer processing module operably coupled to:
      divide a string of data into a plurality of data subsets;
      generate a plurality of data slice subsets from the plurality of data subsets;
      combine two or more of the plurality of data slice subsets into a first data slice by at least one of:
         appending a first one of the two or more of the plurality of data slice subsets to a second one of the two or more of the plurality of data slice subsets; and
         forming the first data slice from the two or more of the plurality of data slice subsets; and
      combine another two or more of the plurality of data slice subsets into a second data slice;
      send, via the communication network interface, the first data slice to a first storage node of a dispersed storage system; and
      send, via the communication network interface, the second data slice to a second storage node of the dispersed storage system.

8. The computer of claim 7, wherein the computer processing module is further operable to generate the plurality of data slice subsets from the plurality of data subsets by:
   performing a coding function on the plurality of data subsets to produce coded data subsets, wherein the plurality of data slice subsets includes the coded data subsets and the plurality of data subsets.

9. The computer of claim 7, wherein the computer processing module is further operable to generate the plurality of data slice subsets from the plurality of data subsets by:
   performing an information dispersal algorithm on the plurality of data subsets to produce the plurality of data slice subsets.

10. The computer of claim 7 further comprises:
   the string of data is one of a plurality of strings of a data, wherein the plurality of strings of data represent a file.

11. The computer of claim 10, wherein the computer processing module is further operable to:
   divide a second string of data of the plurality of strings of data into a second plurality of data subsets;
   generate a second plurality of data slice subsets from the second plurality of data subsets;
   combine two or more of the second plurality of data slice subsets into a third data slice;
   combine another two or more of the second plurality of data slice subsets into a fourth data slice;
   send, via the communication network interface, the third data slice to the first storage node of a dispersed storage system; and
   send, via the communication network interface, the fourth data slice to the second storage node of the dispersed storage system.

* * * * *